Aug. 15, 1939.  V. W. WALZ  2,169,547
COOKING KETTLE
Filed Jan. 28, 1937
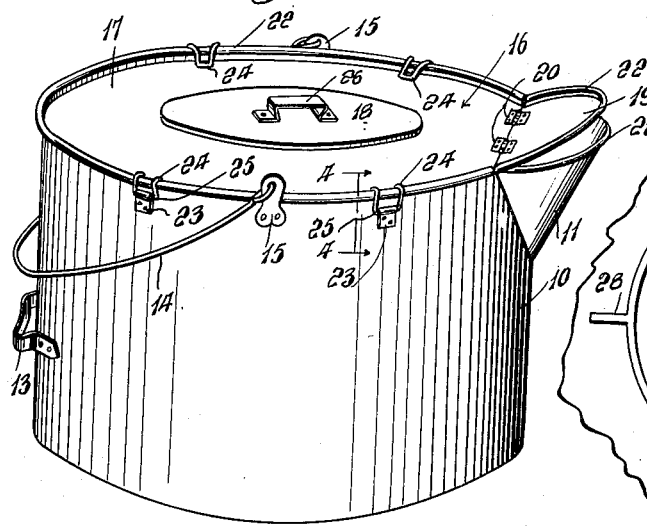
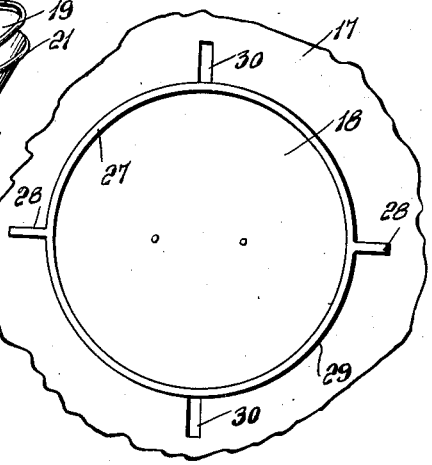
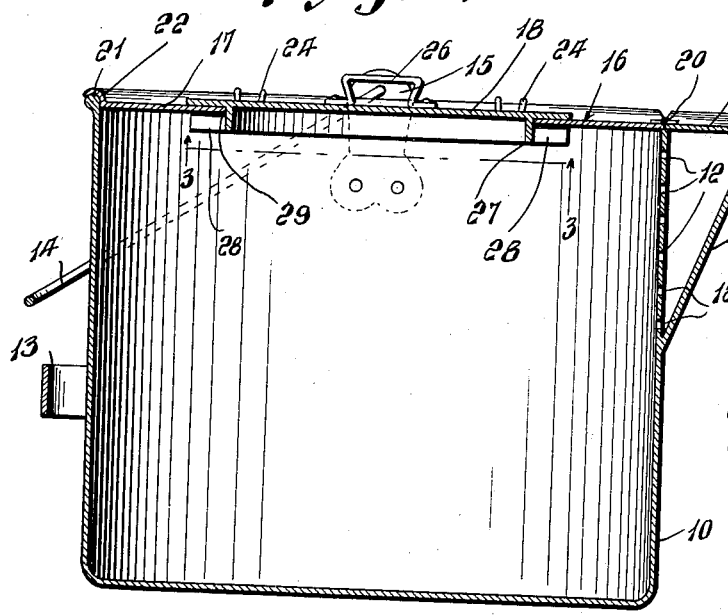
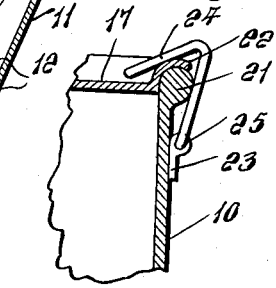
Inventor
V. W. Walz
By L. F. Kandrepl
Attorney Patented Aug. 15, 1939

2,169,547

UNITED STATES PATENT OFFICE 2,169,547

COOKING KETTLE

Valeria Wilkowski Walz, Perham, Minn.

Application January 28, 1937, Serial No. 122,841

1 Claim. (Cl. 53—1)

This invention relates to improvements in cooking kettles.

The main object of the invention is to provide a kettle with a lid composed of two parts, with means to connect the parts together against accidental displacement, but arranged so that one of the parts may be separately removed from the other so as to permit viewing the contents of the kettle, or the insertion of a tool to remove some of the contents.

Another object of the invention is to provide a container having a spout, and an extension pivotally secured to the lid to cover said spout, so that the liquid can be poured from the container without removing the lid.

Another object of the invention is to provide the container with clasps to engage the lid to hold it on the container.

A further object of the invention is to provide only the inner section of the lid with a handle so that the parts must be connected before the outer section can be removed.

A further object of the invention is to provide a container from which both liquids and solids can be removed without removing the entire lid.

Other objects and advantages of the invention will become apparent from the drawing and description to follow.

In the drawing—

Figure 1 is a perspective view of the utensil assembled,

Figure 2 is a vertical sectional view of the same,

Figure 3 is a fragmentary view of the underside of the lid on the line 3—3 of Figure 2, and Figure 4 is an enlarged fragmentary view in section showing one of the swinging clasps.

Referring more particularly to the drawing wherein like reference characters designate like or corresponding parts in the different views, 10 is the container having a spout 11 extending outwardly from the wall thereof. The container 10 is provided with openings 12 to permit the passage of liquid from container 10 to spout 11.

The container 10 is provided with lifting means comprising a handle 13 secured adjacent the bottom of the container, and a bail 14 secured to ears 15 which are secured to opposite sides of and adjacent the top of the container 10.

A lid 16 comprising an outer section 17, an inner section 18, and an extension 19, pivotally secured to section 17 by means of hinges 20, is adapted to engage the rim 21 of the container 10 and the spout 11 to form a cover.

The edges of sections 17 and 19 are provided with an upturned convex flange 22 to fit rim 21. Brackets 23 secured to container 10 and having swinging clasps 24 pivoted thereto, are adapted to engage flange 22 to hold lid 16 in position upon rim 21. Each of the clasps 24 is composed of a single strand of wire bent double and having its end extending through opposite ends of an opening 25 in brackets 23. The clasps 24 are V-shaped in elevation as shown in Figure 4 so as to tightly engage flange 22.

Section 18 of lid 16 is provided with a handle 26 mounted upon its upper face. A circular flange 27 extends downwardly from the underside of section 18 and has pins 28 extending outwardly from opposite sides thereof. Section 17 is provided with an opening 29 to receive flange 27 and also with slots 30 to receive pins 28.

In operation assuming the sections of the lid 16 to be assembled, the lid 16 is placed upon rim 21, and the clasps 24 are swung inwardly to engage flange 22 to hold lid 16 in position. The kettle as thus assembled can be lifted by means of the bail 14. If it is desired to remove anything from the container 10, or to look into the container, section 18 can be removed by grasping handle 26 and twisting until pins 28 are in alinement with slots 30, when section 18 can be lifted from section 17 exposing opening 29. To replace section 18 pins 28 being alined with slots 30 section 18 is lowered into position and twisted about a quarter of a turn. To pour off liquid bail 14 and handle 13 are each grasped with one hand and spout 11 of container 10 is tilted downward so that liquid will flow through openings 12 and out through spout 11, the force of the liquid lifting extension 19 of lid 16.

It is to be understood that only the preferred embodiment of the invention has been shown, the right being reserved to make such changes and modifications as will not depart from the spirit and scope of the invention.

I claim—

In combination with a cooking kettle or pot provided with a spout; a cover comprising an outer section adapted to fit the edge of said kettle and having a cylindrical opening in its center into which a plurality of radially disposed, spaced slots, open, a member hinged to said section to cover the spout; and an inner section having an annular depending flange, spaced from its edge, to extend into the opening in the outer section, and lugs projecting outwardly from the lower part of said flange to engage the underside of the outer section to connect the sections, said inner section being adapted to be turned on the outer section to aline the lugs and slots to allow the lugs to move through the slots to disengage the sections, and a handle attached to the inner section for removing it or the cover as a unit.

VALERIA WILKOWSKI WALZ.